(12) United States Patent
Kawasumi

(10) Patent No.: US 9,436,073 B2
(45) Date of Patent: Sep. 6, 2016

(54) ILLUMINATION OPTICAL SYSTEM AND IMAGE PROJECTION APPARATUS

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 14/178,857

(22) Filed: Feb. 12, 2014

(65) Prior Publication Data

US 2014/0226132 A1    Aug. 14, 2014

(30) Foreign Application Priority Data

Feb. 13, 2013 (JP) .................................. 2013-025152

(51) Int. Cl.
*G03B 21/20* (2006.01)
*H04N 9/31* (2006.01)
*G02B 27/09* (2006.01)

(52) U.S. Cl.
CPC ....... *G03B 21/2073* (2013.01); *G02B 27/0961* (2013.01); *G03B 21/208* (2013.01); *H04N 9/3152* (2013.01)

(58) Field of Classification Search
CPC  G03B 21/208; G03B 21/20; G03B 21/2073; G03B 21/2093; G02B 27/0961; H04N 9/3152; H04N 9/315; H04N 9/31
USPC ...................................................... 353/38, 20
See application file for complete search history.

(56) References Cited

U.S. PATENT DOCUMENTS 6,257,726 B1 *  7/2001  Okuyama ............ G02B 27/283
                                                              348/E5.137
6,491,396 B2 * 12/2002  Karasawa .............. G03B 21/26
                                                              349/7

(Continued)

FOREIGN PATENT DOCUMENTS

CN         1405633 A      3/2003
CN       101097394 A      1/2008

(Continued)

OTHER PUBLICATIONS

Official Action issued in TW103104408 mailed Nov. 17, 2014. English translation provided.

(Continued)

*Primary Examiner* — William C Dowling
*Assistant Examiner* — Ryan Howard
(74) *Attorney, Agent, or Firm* — Rossi, Kimms & McDowell LLP

(57) ABSTRACT

An illumination optical system is capable of changing a light beam diameter in one of first and second cross sections orthogonal to each other that include an optical axis, and includes a light source, a condenser lens that concentrates light from the light source, a first fly-eye lens including a first lens cell on which light concentrated by the condenser lens is incident, a second fly-eye lens including a second lens cell, a polarization conversion element that performs polarization conversion on light from the second fly-eye lens, and an image display element that displays an image based on light from the polarization conversion element, and widths of the image display element and a light emitting surface of the light source, widths of the first and second fly-eye lens, and change rates α and β of the light beam diameters are set within appropriate ranges.

18 Claims, 13 Drawing Sheets

(56) References Cited

U.S. PATENT DOCUMENTS

| | | |
|---|---|---|
| 6,601,958 B2* | 8/2003 | Ito .................. H04N 9/3167 348/E9.027 |
| 2003/0053217 A1 | 3/2003 | Mori |
| 2006/0290903 A1* | 12/2006 | Inoko .................. G03B 21/208 353/102 |
| 2007/0291344 A1* | 12/2007 | Yamauchi ............ G02B 3/0043 353/38 |
| 2007/0296926 A1 | 12/2007 | Takauchi et al. |
| 2010/0002217 A1 | 1/2010 | Fiolka et al. |
| 2012/0140436 A1 | 6/2012 | Yang et al. |
| 2012/0242961 A1* | 9/2012 | Miura ................ G02B 27/0961 353/38 |
| 2012/0293786 A1 | 11/2012 | Fiolka et al. |

FOREIGN PATENT DOCUMENTS

| | | |
|---|---|---|
| JP | 07-181392 A | 7/1995 |
| TW | 201229434 A1 | 7/2012 |

OTHER PUBLICATIONS

Office Action issued in Chinese Application No. 201410046622.8 dated Jul. 10, 2015. English translation provided.

* cited by examiner

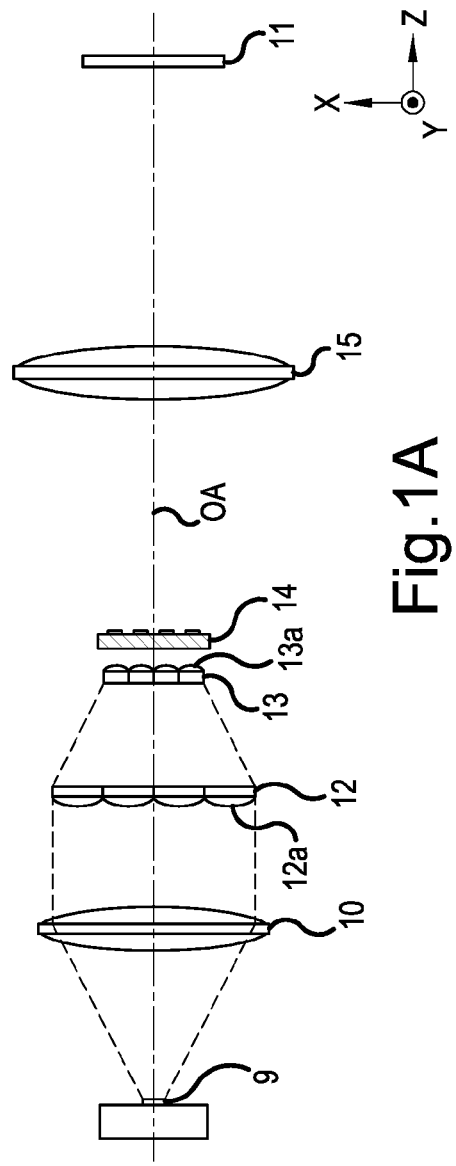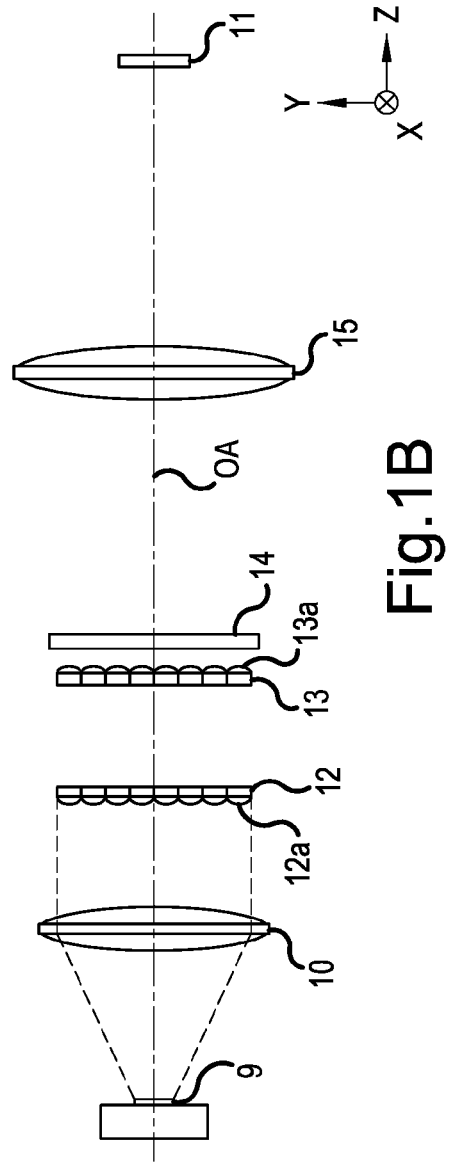

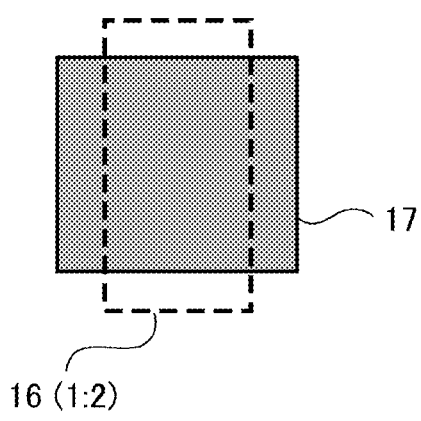
FIG. 3A
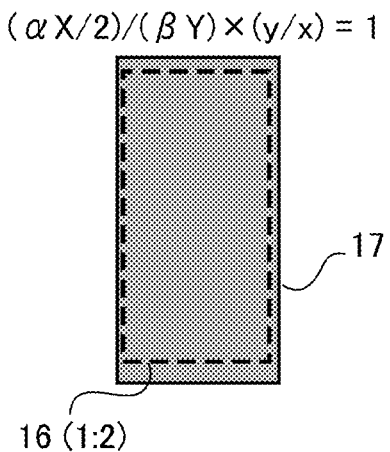
FIG. 3B
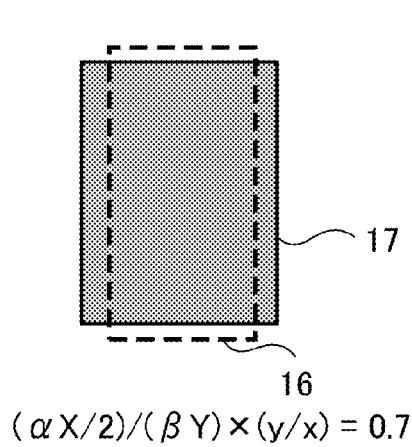
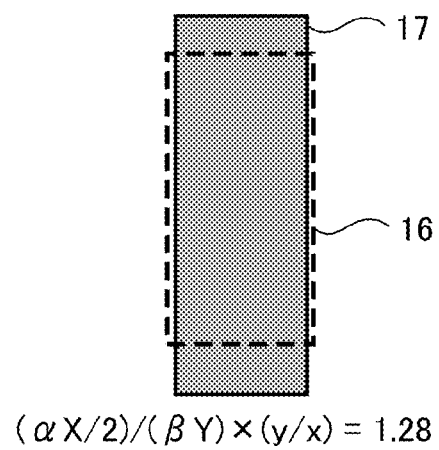
FIG. 3C

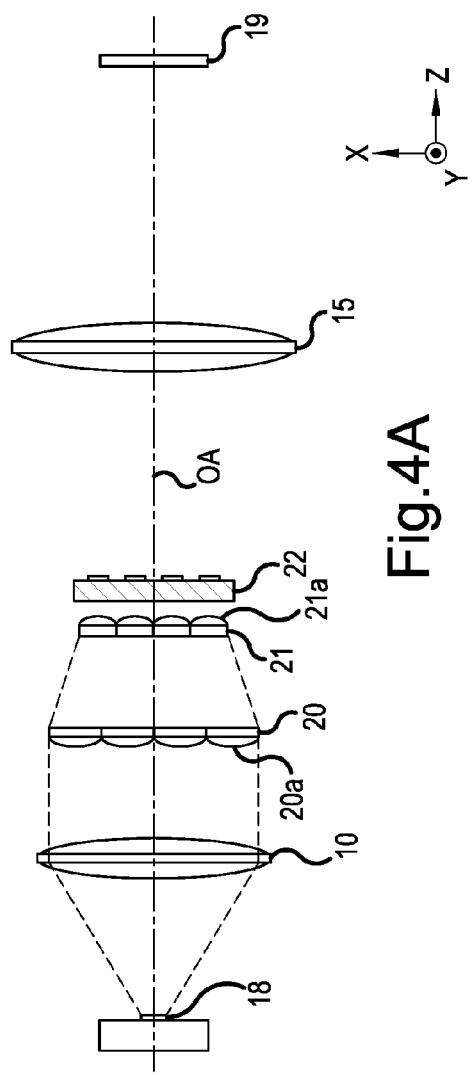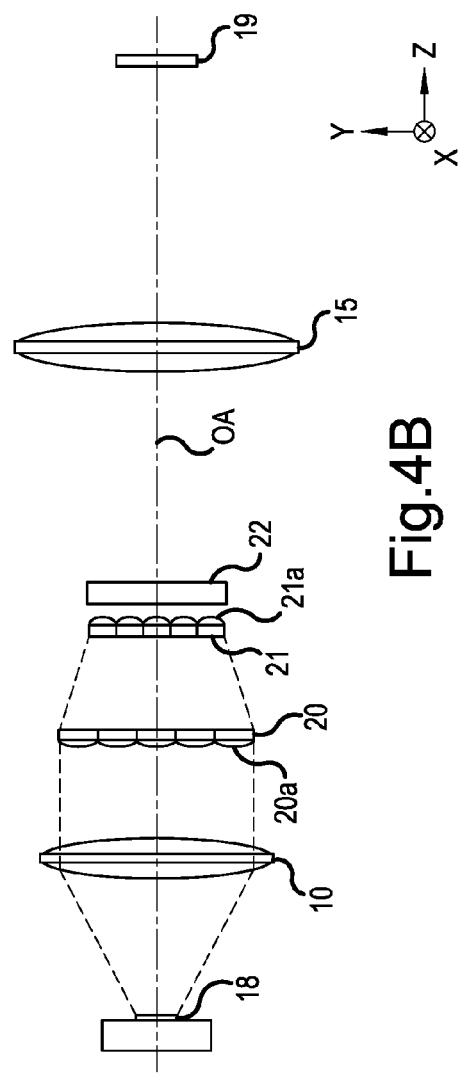

21a (4:3)   23 (2:3)        24 (2:3)        23 (2:3)   24 (2:3)

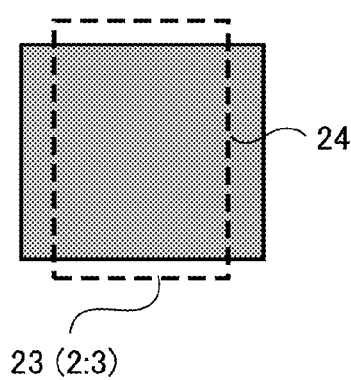
23 (2:3)
FIG. 6A
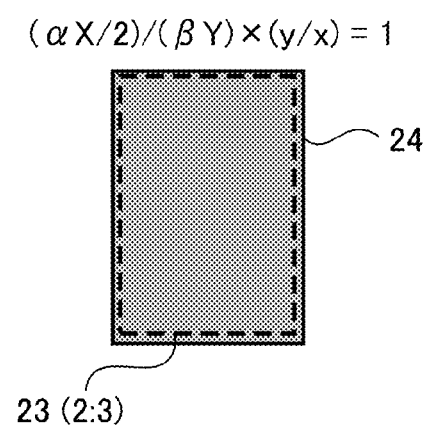
$(\alpha X/2)/(\beta Y) \times (y/x) = 1$
23 (2:3)
FIG. 6B
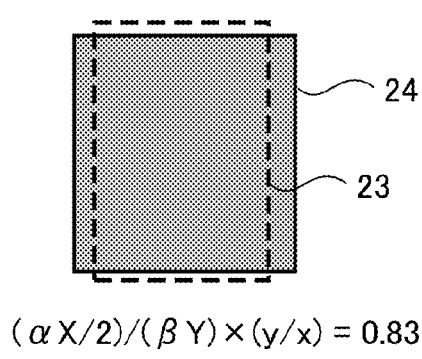
$(\alpha X/2)/(\beta Y) \times (y/x) = 0.83$
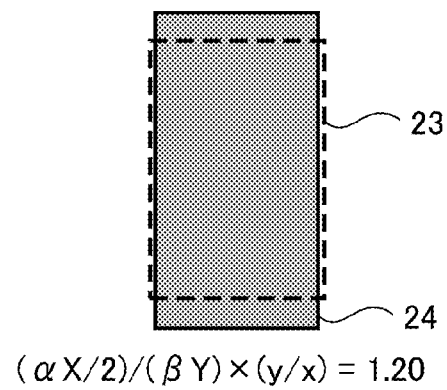
$(\alpha X/2)/(\beta Y) \times (y/x) = 1.20$
FIG. 6C

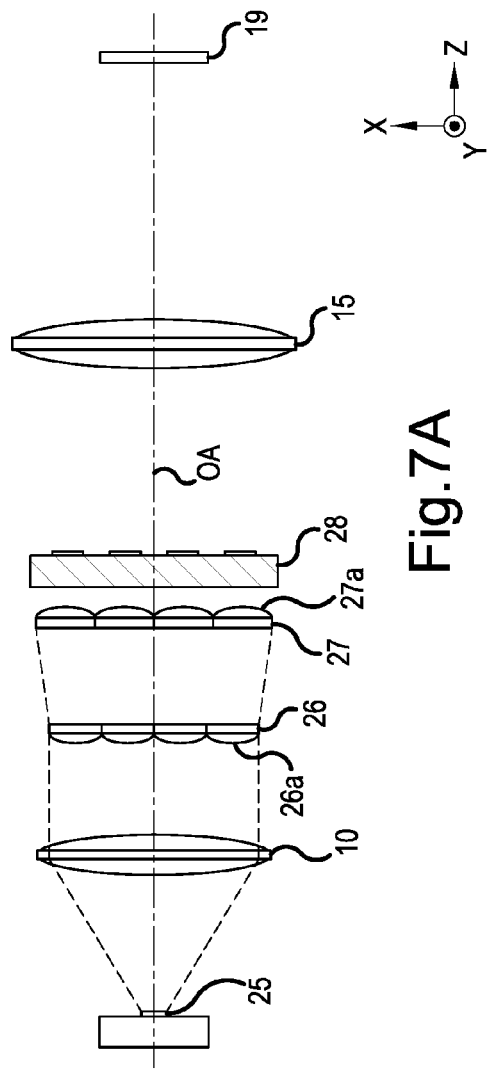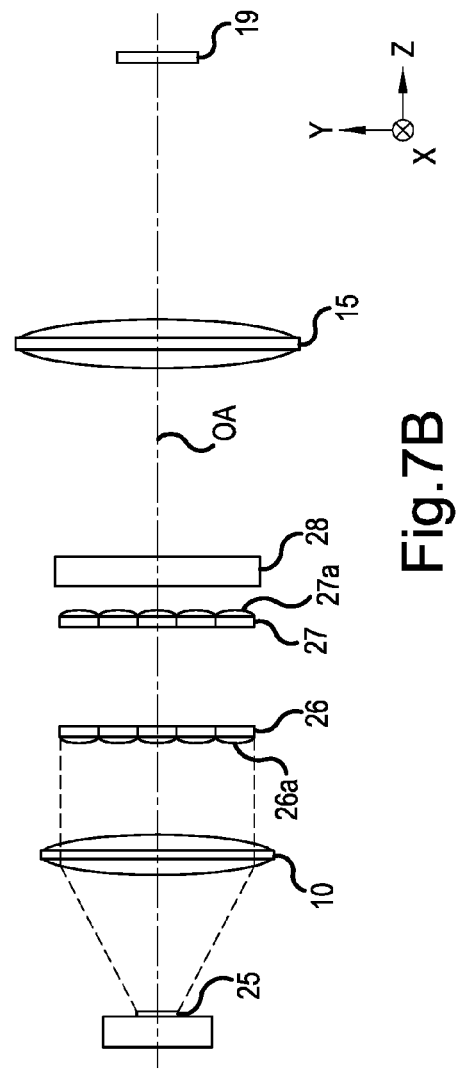

27a (6:4)  29 (3:4)         30 (3:4)         29 (3:4)   30 (3:4)

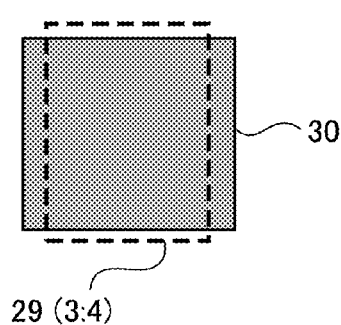
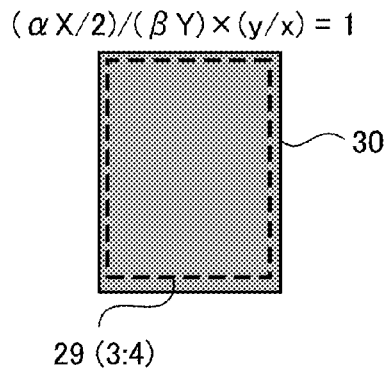
FIG. 9A
FIG. 9B
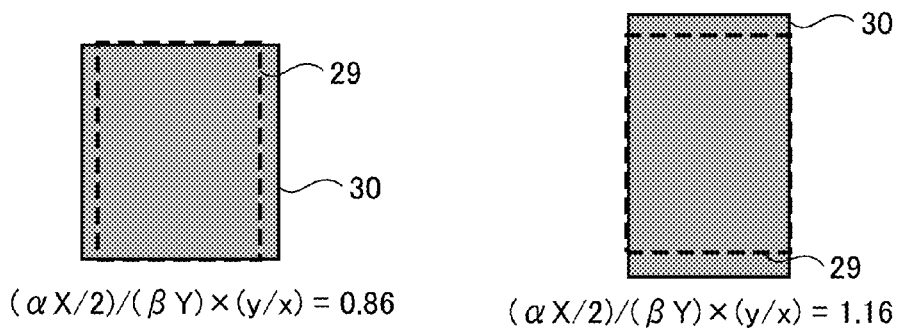
FIG. 9C
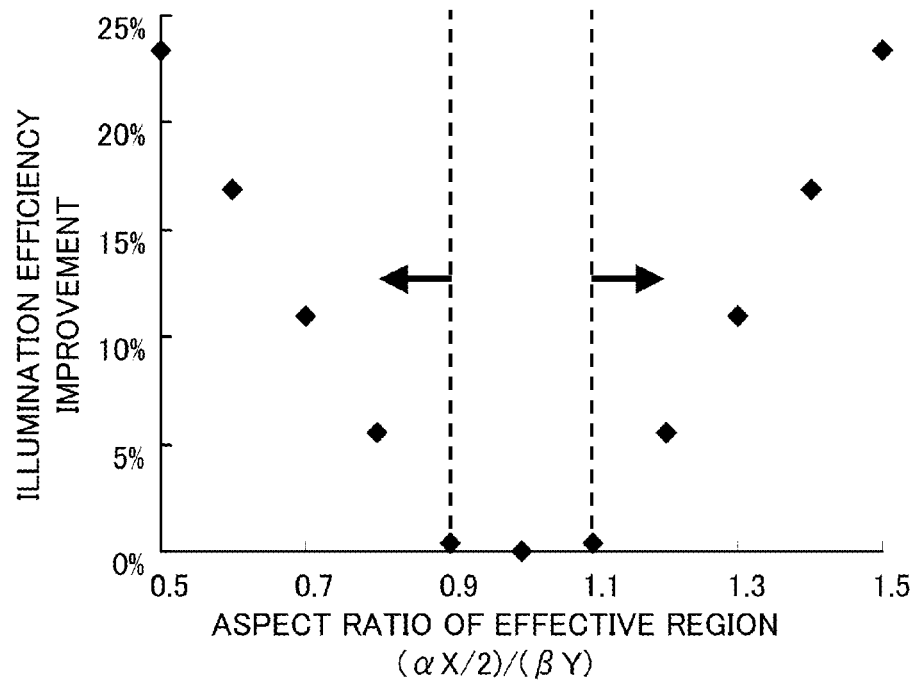
FIG. 10

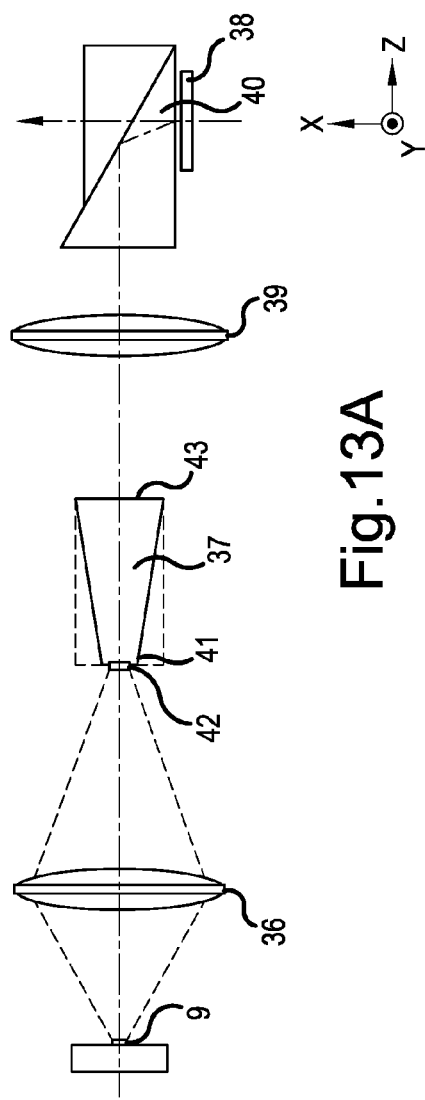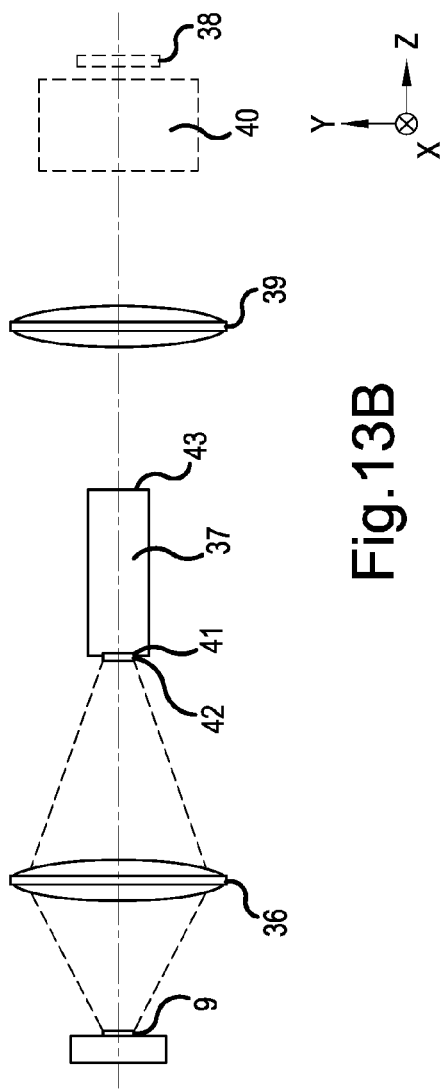

ILLUMINATION OPTICAL SYSTEM AND IMAGE PROJECTION APPARATUS

BACKGROUND OF THE INVENTION

1. Field of the Invention

The present invention relates to an illumination optical system and an image projection apparatus.

2. Description of the Related Art

Conventionally, there have been used illumination optical systems which include a fly-eye lens and a polarization conversion element to uniformly and efficiently illuminate an image display element such as a liquid crystal light valve. In order to increase illumination efficiency in the illumination optical system, an amount of the light beam passing through the effective region formed by the lens cell of the fly-eye lens and the polarization conversion element needs to be increased.

Light source images formed by the illumination optical system are each in a rod shape, which reflects the shape of a discharge arc that is the light source, and are formed to have an inclination according to the position on the reflective surface of a paraboloid reflector through which the light beam passes to form the light source image. Thus, the light source images have a radial distribution around an optical axis of the illumination optical system. Meanwhile, the effective regions formed by the fly-eye lens and the polarization conversion element are rectangular. Thus, the light source image may stick out of (project from) the effective region, resulting in a reduction in the illumination efficiency of the illumination optical system.

For the light source images that spread out radially because the paraboloid reflector is used, the effective region is preferably square in order to obtain maximum illumination efficiency with the effective region of a minimum area. Japanese Patent Laid-open No. H07-181392 discloses a configuration where the effective region is made square to maintain the illumination efficiency.

In the configuration of Japanese Patent Laid-open No. H07-181392, however, in order to further increase light use efficiency, for example a polarization conversion element needs to be arranged. However, the width of a polarization beam splitter constituting the polarization conversion element is half the width of the lens cell of the fly-eye lens. Therefore, the effective region is in a rectangular shape, resulting in a loss being likely to occur.

SUMMARY OF THE INVENTION

The present invention provides an illumination optical system and an image projection apparatus which has high illumination efficiency.

An illumination optical system as one aspect of the present invention is capable of changing a light beam diameter in at least one of a first cross section and a second cross section orthogonal to each other, the first and second cross sections include an optical axis, and the illumination optical system includes a light source, a condenser lens configured to concentrate light from the light source, a first fly-eye lens including a first lens cell on which light concentrated by the condenser lens is incident, a second fly-eye lens including a second lens cell corresponding to the first lens cell, a polarization conversion element configured to perform polarization conversion on light from the second fly-eye lens, and an image display element configured to display an image based on light from the polarization conversion element, and widths of the image display element, widths of a light emitting surface of the light source, widths of the first fly-eye lens, widths of the second fly-eye lens, and change rates $\alpha$ and $\beta$ of the light beam diameters are set within appropriate ranges.

An illumination optical system as another aspect of the present invention is capable of changing a light beam diameter in at least one of a first cross section and a second cross section orthogonal to each other, the first and second cross sections include an optical axis, and the illumination optical system includes a light source, a condenser lens configured to concentrate light from the light source, a first fly-eye lens including a first lens cell on which light concentrated by the condenser lens is incident, a second fly-eye lens including a second lens cell corresponding to the first lens cell, and an image display element configured to display an image based on light from the second fly-eye lens, and widths of the image display element, widths of a light emitting surface of the light source, widths of the first fly-eye lens, widths of the second fly-eye lens, and change rates $\alpha$ and $\beta$ of the light beam diameters are set within appropriate ranges.

An illumination optical system as another aspect of the present invention is capable of changing a light beam diameter in at least one of a first cross section and a second cross section orthogonal to each other, the first and second cross sections include an optical axis, and the illumination optical system includes a light source, a condenser lens configured to concentrate light from the light source, a rod integrator on which light concentrated by the condenser lens is incident, and an image display element configured to display an image based on light from the rod integrator, and widths of the image display element, widths of a light emitting surface of the light source, widths of an exit surface of the rod integrator, widths of an entrance surface of the rod integrator, and change rates $\alpha$ and $\beta$ of the light beam diameters are set within appropriate ranges.

An image projection apparatus as another aspect of the present invention includes the illumination optical system.

Further features and aspects of the present invention will become apparent from the following description of exemplary embodiments with reference to the attached drawings.

BRIEF DESCRIPTION OF THE DRAWINGS

FIGS. 1A and 1B are configuration diagrams of an illumination optical system in Embodiment 1.

FIGS. 3A-3C are diagrams illustrating a loss when a difference occurs in an aspect ratio between the effective region of the illumination optical system and the light emitting surface of the light source in Embodiment 1.

FIGS. 4A and 4B are configuration diagrams of an illumination optical system in Embodiment 2.

FIGS. 6A-6C are diagrams illustrating a loss when a difference occurs in an aspect ratio between the effective region of the illumination optical system and the light emitting surface of the light source in Embodiment 2.

FIGS. 7A and 7B are configuration diagrams of an illumination optical system in Embodiment 3.

FIGS. 9A-9C are diagrams illustrating a loss when a difference occurs in an aspect ratio between the effective region of the illumination optical system and the light emitting surface of the light source in Embodiment 3.

FIG. 10 is a graph illustrating a change of an effect depending on the aspect ratio of the effective region in each of Embodiments 1 to 3.

FIGS. 13A and 13B are configuration diagrams of an illumination optical system in Embodiment 5.

DESCRIPTION OF THE EMBODIMENTS

Figures 2A, 2B, 2C:
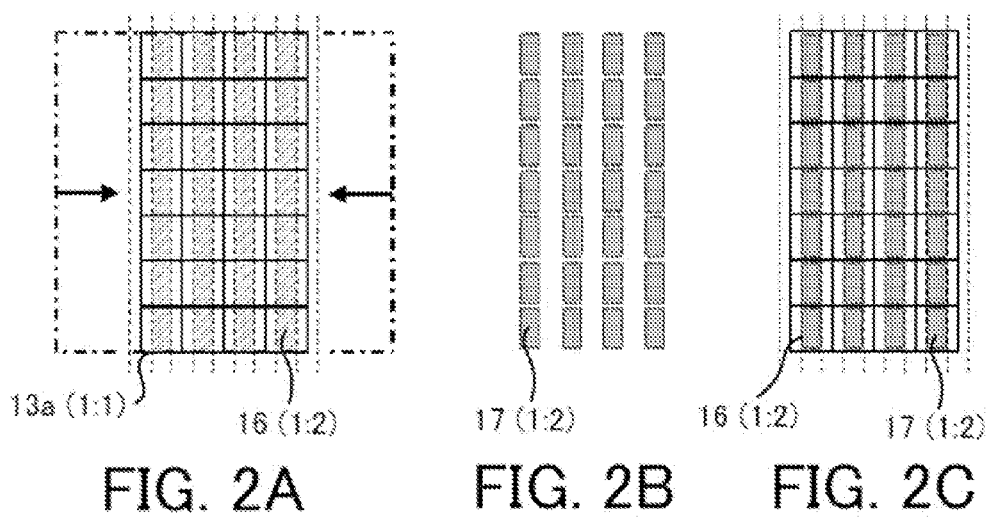
FIGS. 2A-2C are diagrams illustrating a relation between an effective region and a light source image of the illumination optical system in Embodiment 1.

Exemplary embodiments of the present invention will be described below with reference to the accompanied drawings. In the drawings, the same elements will be denoted by the same reference numerals and the descriptions thereof will be omitted.

Embodiment 1

First of all, referring to FIGS. 1A and 1B, a configuration of an illumination optical system in Embodiment 1 of the present invention will be described. FIGS. 1A and 1B are configuration diagrams of the illumination optical system in the present embodiment, and FIG. 1A illustrates a cross-sectional view when viewed in a Y direction and FIG. 1B illustrates a cross-sectional view when viewed in an X direction. The illumination optical system of the present embodiment is configured such that a diameter of a light beam in a first cross section (an XZ plane) or a second cross section (a YZ plane) can be changed, the cross sections being orthogonal to each other and including an optical axis OA.

In FIGS. 1A and 1B, reference numeral 9 denotes a light source (a light emitting diode). The light source 9 has a rectangular light emitting surface having an aspect ratio of about 1:2. The aspect ratio is a ratio of a width (a length) in the first cross section (the X direction) to a width (a length) in the second cross section (the Y direction). Reference numeral 10 denotes a condenser lens that concentrates light from the light source 9. Reference numeral 11 denotes an image display element (a liquid crystal image display element) having an aspect ratio of 2:1. The image display element 11 (a light modulation element) displays an image based on light, i.e. modulating light, from a polarization conversion element 14 (a condenser lens 15) described below. Reference numeral 12 denotes a first fly-eye lens. The first fly-eye lens 12 is configured to have a plurality of lens cells 12a (a first lens cell) arranged in a matrix, on which light concentrated by the condenser lens 10 is incident. In the present embodiment, each lens cell 12a is rectangular and substantially similar in shape to the image display element 11.

Reference numeral 13 denotes a second fly-eye lens. The second fly-eye lens 13 has a plurality of lens cells 13a (a second lens cell) corresponding respectively to the plurality of lens cells 12a of the first fly-eye lens 12. Reference numeral 14 denotes a polarization conversion element. The polarization conversion element 14 performs polarization conversion on light from the second fly-eye lens 13, i.e. puts the light into a predetermined polarization state. Reference numeral 15 denotes a condenser lens. In FIGS. 1A and 1B, the optical axis OA is parallel to a Z axis (a Z direction). The two cross sections including the optical axis OA and orthogonal to each other (the cross section illustrated in FIG. 1A and the cross section illustrated in FIG. 1B) are referred to as a first cross section (a cross section orthogonal to the Y axis) and a second cross section (a cross section orthogonal to the X axis) respectively.

The shape of the light emitting surface of the light source 9 (the light emitting diode) can be arbitrarily determined in accordance with the way to cut out a semiconductor wafer. The rectangular light emitting surface shape having an aspect ratio of 1:2 can be made relatively easily. Light emitted from the light source 9 is concentrated by the condenser lens 10 to become substantially parallel rays of a light beam, which are incident on the first fly-eye lens 12. The lens cells 12a of the first fly-eye lens 12 form a plurality of light source images at the corresponding lens cells 13a of the second fly-eye lens 13 and the polarization conversion element 14 (or their neighborhood).

The outline of the second fly-eye lens 13 is compressed in size to about 50% of that of the first fly-eye lens 12 along the first cross-sectional direction (the X direction) in FIG. 1A, and thus the illumination optical system is made smaller. Here, the aspect ratio of the lens cell 13a of the second fly-eye lens 13 is about 1:1. The polarization conversion element 14 performs a polarization conversion of a plurality of divided light beams emitted from the second fly-eye lens 13, and then the plurality of divided light beams are overlapped on the image display element 11 by the condenser lens 15.

Subsequently, the shapes of the effective region 16 formed by the second fly-eye lens 13 and the polarization conversion element 14 and of the light source images 17 will be described with reference to FIGS. 2A-2C. FIGS. 2A-2C are diagrams illustrating a relation between the effective regions and light source images of the illumination optical system in the present embodiment.

FIG. 2A illustrates a shape of an effective region 16 formed by the second fly-eye lens 13 and the polarization conversion element 14. The aspect ratio of the lens cell 13a of the second fly-eye lens 13 is about 1:1. Hence, the effective region 16 has a rectangular shape with an aspect ratio of about 1:2 due to the polarization conversion element 14. Thus, the effective region 16 has a shape of reducing the illumination efficiency for a radial light source image distribution created by, e.g., the discharge arc of a lamp and a reflector.

FIG. 2B illustrates a shape of a light source image 17 formed by the illumination optical system in the present embodiment. As compared with the above case of using the reflector, the light source image 17 formed by the imaging optical system having the condenser lens 10 and the first fly-eye lens 12 are do not have a radial shape, but are formed with holding the aspect ratio of 1:2 and the arrangement of the light emitting surface of the light source 9. This is because each of the divided light beams formed by the first fly-eye lens 12 is not imaged with an inclination since a plane passing through the condenser lens 10 has the same focal length, not depending on the position of the plane.

Accordingly, as illustrated in FIG. 2C, in the configuration using the condenser lens 10 of the present embodiment, the light source image 17 is formed with holding a rectangular shape and an arrangement having an aspect ratio of 1:2, similarly to the light emitting surface of the light source 9.

Hence, the aspect ratios of the effective region 16 and the light source image 17 are substantially similar, and a reduction in the illumination efficiency can be prevented (or lessened) although the effective region 16 is rectangular.

According to the illumination optical system of the present embodiment, the outline of the second fly-eye lens 13 is compressed, thus succeeding in making the optical system (the illumination optical system) smaller, and at the same time even when the effective region 16 formed by the second fly-eye lens 13 and the polarization conversion element 14 are rectangular, high illumination efficiency can be maintained.

In the present embodiment, the aspect ratio of the effective region 16 and the aspect ratio of the light emitting surface of the light source 9 are made to coincide (substantially coincide), but a sufficient effect can be obtained even when some of aspect ratio differences are contained. In the present embodiment, the aspect ratio of the image display element 11 in the first cross section (FIG. 1A) and the second cross section (FIG. 1B) is denoted by X:Y (X and Y are widths of the image display element 11), and the aspect ratio of the light emitting surface of the light source 9 is denoted by x:y (x and y are widths of the light emitting surface). Further, diameters (outside diameters) of the first fly-eye lens 12 in the first and second cross sections are denoted by $D1x$ and $D1y$, respectively. Yet further, diameters (outside diameters) of the second fly-eye lens 13 in the first and second cross sections are denoted by $D2x$ and $D2y$, respectively. Typically, an outer shape of a fly-eye lens is rectangular as seen from a front side (in an optical axis direction). Therefore, the diameters $D1x$, $D1y$, $D2x$, and $D2y$ may be widths (lengths in a direction perpendicular to the optical axis) of the first and second fly-eye lenses 12 and 13 in the first and second cross sections (or in planes parallel to the first and second cross sections). Change rates (compression or enlargement rate) of the light beam (the light beam diameter) in the first and second cross sections are defined as $\alpha=D2x/D1x$ and $\beta=D2y/D1y$, respectively. Then, the aspect ratio difference between the effective region 16 and the light emitting surface of the light source 9 is represented by the following Expression (1).

$$(\alpha X/2)/(\beta Y) \times (y/x) \tag{1}$$

For example, in the present embodiment, the aspect ratio of the image display element 11 satisfies X:Y=2:1, and the aspect ratio of the light emitting surface of the light source 9 satisfies x:y=1:2. Because the light beam diameter in the first cross section is not compressed, $\alpha=1$ is satisfied, and because the compression ratio of the light beam diameter in the second cross section is 50%, $\beta=0.5$ is satisfied. Thus, Expression (1) representing the aspect ratio difference satisfies the relation represented by the following Expression (2), which shows that there is no aspect ratio difference.

$$(\alpha X/2)/(\beta Y) \times (y/x) = 1 \tag{2}$$

On the other hand, as a value of Expression (1), i.e. a value at the left side of Expression (2), becomes farther from 1, the difference (the aspect ratio difference) between the aspect ratio of the effective region 16 and the aspect ratio of the light emitting surface of the light source 9 becomes greater.

Subsequently, referring to FIGS. 3A to 3C, a loss when a difference occurs between the aspect ratio of the effective region 16 of the illumination optical system and the aspect ratio of the light emitting surface of the light source 9 will be described. FIGS. 3A to 3C are diagrams illustrating a loss when a difference occurs in aspect ratio between the effective region 16 and the light emitting surface of the light source 9. FIG. 3A illustrates the case where the light source 9 having a square light emitting surface of 1:1 in aspect ratio is applied to the rectangular effective region 16 having an aspect ratio of 1:2. FIG. 3B illustrates the case where the light source 9 having a rectangular light emitting surface, whose area is the same as that of the square, of the same aspect ratio (1:2) as that of the effective region 16 is applied to the effective region 16. FIG. 3C illustrates the case where there is some difference between the aspect ratio of the effective region 16 and the aspect ratio of the light emitting surface of the light source 9. Those drawings illustrate the way that a loss occurs for the respective cases.

In FIG. 3A, a case is supposed where a symmetric light source image 17 that occurs due to the use of the reflector is applied to the rectangular effective region 16. When the square light source image 17 is applied to the rectangular effective region 16, the light source image 17 greatly sticks out (is projected) compared with the effective region 16, and thus a loss occurs, resulting in a reduction in illumination efficiency. The loss of the illumination optical system can be generally represented by the area of the part sticking out of (a projection portion from) the effective region 16 relative to the total area of the light source image 17, and here the loss is about 32%.

On the other hand, in FIG. 3B, because a rectangular light source image 17 having the same aspect ratio as that of the effective region 16 is applied to the effective region 16, the area of the part of the light source image 17 sticking out of (projected from) the effective region 16 becomes a minimum, and here the loss is about 9%. In the present embodiment, the difference of about 23% of the loss of FIG. 3B relative to the loss of FIG. 3A is an illumination efficiency improvement effect.

In FIG. 3B, the rectangular light source image 17 having the same aspect ratio is applied to the effective region 16, but the light source image 17 slightly sticks out of (projected from) the effective region 16. In order to more efficiently take in the divergent light beam from the light source 9 in the illumination optical system, the focal length of the reflector or the condenser lens is usually shortened. Note that at this time the imaging magnification of the light source image 17 increases. In order to make the amount of light reaching the image display element 11 greatest, design needs to be made such that the loss due to the light source image 17 sticking out of the effective region 16 and an increase in the light amount caused by an increase in the amount of light taken in from the light source 9 balance out. Hence, design is made such that the light source image 17 sticks out of (projects from) the effective region 16.

In FIG. 3C, if the aspect ratio difference of the light source image 17 relative to the effective region 16 amounts to the amount represented by the following Expression (3) or (4) using Expression (1), in either case, the sticking-out area of the light source image 17 relative to the effective region 16 is about 16%.

$$(\alpha X/2)/(\beta Y) \times (y/x) = 0.78 \tag{3}$$

$$(\alpha X/2)/(\beta Y) \times (y/x) = 1.28 \tag{4}$$

Thus, the difference of about 16% of the loss of FIG. 3C relative to the loss of FIG. 3A is an illumination efficiency improvement effect in these cases.

When the light source 9 having a rectangular light emitting surface of the same aspect ratio is applied to the effective region 16 having an aspect ratio of 1:2, the illumination efficiency is improved by about 23%. On the other hand, when the light source 9 having a light emitting surface having the aspect ratio difference represented by Expression (3) or (4) is applied to it, the illumination efficiency is improved by about 16%. In this case, an effect of about 70% of the greatest illumination efficiency improvement rate (about 23%) is obtained.

Thus, it is preferred that the light source 9 having a rectangular light emitting surface of the same aspect ratio is applied to the rectangular effective region 16. Note that as long as the requirement of the following Expression (5) is satisfied, a sufficient illumination efficiency improvement effect is obtained.

$$0.78<(\alpha X/2)/(\beta Y)\times(y/x)<1.28 \tag{5}$$

Embodiment 2

Next, referring to FIGS. 4A and 4B, the configuration of the illumination optical system in Embodiment 2 of the present invention will be described. FIGS. 4A and 4B are configuration diagrams of an illumination optical system in the present embodiment, and FIG. 4A illustrates a cross-sectional view when viewed in the Y direction and FIG. 4B illustrates a cross-sectional view when viewed in the X direction. The illumination optical system of the present embodiment is configured such that the light beam diameter in a first cross section (an XZ plane) or a second cross section (a YZ plane) can be changed, the cross sections being orthogonal to each other and including an optical axis OA.

In FIGS. 4A and 4B, reference numeral 18 denotes a light source (a light emitting diode). The light source 18 has a rectangular light emitting surface having an aspect ratio of about 2:3. The aspect ratio is a ratio of the width (the length) in the first cross section (the X direction) to the width (the length) in the second cross section (the Y direction). Reference numeral 10 denotes a condenser lens that concentrates light from the light source 18. Reference numeral 19 denotes an image display element (a liquid crystal image display element) having an aspect ratio of 4:3. The image display element 19 (a light modulation element) displays an image based on light (modulating the light) from a polarization conversion element 22 (a condenser lens 15) described below.

Reference numeral 20 denotes a first fly-eye lens. The first fly-eye lens 20 is configured to have a plurality of lens cells 20a (a first lens cell) arranged in a matrix, on which light concentrated by the condenser lens 10 is incident. In the present embodiment, each lens cell 20a is rectangular and substantially similar in shape to the image display element 19.

Reference numeral 21 denotes a second fly-eye lens. The second fly-eye lens 21 has a plurality of lens cells 21a (a second lens cell) corresponding respectively to the plurality of lens cells 20a of the first fly-eye lens 20. Reference numeral 22 denotes a polarization conversion element. The polarization conversion element 22 performs polarization conversion on light from the second fly-eye lens 21 (putting the light into a predetermined polarization state). Reference numeral 15 denotes a condenser lens. In FIGS. 4A and 4B, the optical axis OA is parallel to the Z axis (the Z direction). The two cross sections including the optical axis OA and orthogonal to each other (the cross section illustrated in FIG. 4A and the cross section illustrated in FIG. 4B) are referred to as a first cross section (a cross section orthogonal to the Y axis) and a second cross section (a cross section orthogonal to the X axis), respectively.

The outline of the second fly-eye lens 21 is compressed in size to about 70% of that of the first fly-eye lens 20 along the first cross section direction (the X direction) in FIG. 4A, and thus the illumination optical system is made smaller. Here, the aspect ratio of the lens cell 21a of the second fly-eye lens 21 is about 4:3 as in the first fly-eye lens 20 in a conjugate relation with the image display element 19.

Figure 5A:
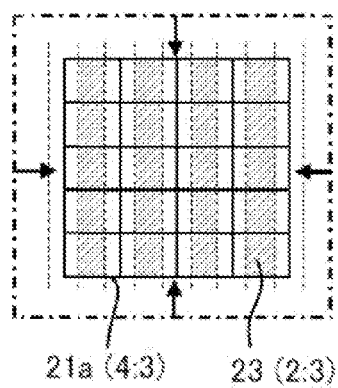
FIGS. 5A-5C are diagrams illustrating a relation between an effective region and a light source image of the illumination optical system in Embodiment 2.
Figure 5B:
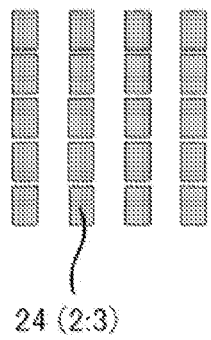
Figure 5C:
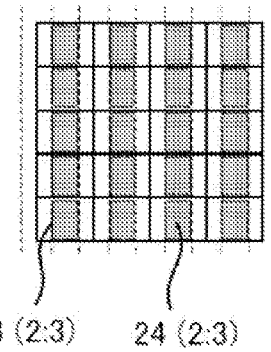

Subsequently, referring to FIGS. 5A to 5C, the shapes of the effective regions 23 formed by the second fly-eye lens 21 and the polarization conversion element 22 and of the light source images 24 will be described. FIGS. 5A-5C are diagrams illustrating a relation between the effective region and the light source image of the illumination optical system in the present embodiment.

FIG. 5A illustrates the shape of the effective region 23 formed by the second fly-eye lens 21 and the polarization conversion element 22. The aspect ratio of the lens cell 21a of the second fly-eye lens 21 is about 4:3. Hence, the effective region 23 is in a rectangular shape having an aspect ratio of about 2:3 due to the polarization conversion element 22. Thus, the effective region 23 has a shape of reducing the illumination efficiency for a radial light source image distribution created by, e.g., the discharge arc of a lamp and a reflector.

FIG. 5B illustrates the shape of light source images 24 formed by the illumination optical system in the present embodiment. In the present embodiment, the light source 18 having a light emitting surface of the same aspect ratio as that of the effective region 23 is used, and the light beam from the light source 18 is concentrated by the condenser lens 10. Hence, the light source image 24 is formed with holding the aspect ratio of 2:3 and the arrangement that are the same as those of the light emitting surface of the light source 18. Hence, as illustrated in FIG. 5C, the aspect ratios of the effective region 23 and the light source image 24 are substantially similar, and a reduction in the illumination efficiency can be prevented (or lessened) although the effective region 23 is rectangular.

According to the illumination optical system of the present embodiment, the outline of the second fly-eye lens 21 is compressed, thus succeeding in making the optical system (the illumination optical system) smaller, and at the same time even where the effective regions 23 formed by the second fly-eye lens 21 and the polarization conversion element 22 are rectangular, high illumination efficiency can be maintained.

For example, in the present embodiment, the aspect ratio of the image display element 19 satisfies X:Y=4:3, and the aspect ratio of the light emitting surface of the light source 18 satisfies x:y=2:3. Because the compression ratios of the light beam diameter in the first and second cross sections are both 70%, $\alpha=0.7$ and $\beta=0.7$ are satisfied. Thus, a value of Expression (1), i.e. a value of the left side of Expression (2), representing the aspect ratio difference is 1, similarly to Embodiment 1.

Subsequently, referring to FIGS. 6A to 6C, a loss when a difference occurs in aspect ratio between the effective region 23 of the illumination optical system and the light emitting surface of the light source 18 will be described. FIGS. 6A-6C are diagrams illustrating a loss when a difference occurs in aspect ratio between the effective region 23 and the light emitting surface of the light source 18. FIG. 6A illustrates the case where the light source 18 having a square light emitting surface of 1:1 in aspect ratio is applied to the rectangular effective region 23 having an aspect ratio of 2:3. FIG. 6B illustrates the case where the light source 18 having a rectangular light emitting surface, whose area is the same as that of the square, of the same aspect ratio (2:3) as that of the effective region 23 is applied to the effective region 23. FIG. 6C illustrates the case where there is some difference between the aspect ratio of the effective region 23 and the aspect ratio of the light emitting surface of the light source 18. Those drawings illustrate the way that a loss occurs for the respective cases.

In FIG. 6A, the loss of the illumination optical system can be generally represented by the area of the part sticking out of (the projection portion from) the effective region 23 relative to the total area of the light source image 24, and here the loss is about 22%.

On the other hand, in FIG. 6B, because a rectangular light source image 24 having the same aspect ratio as that of the effective region 23 is applied to the effective region 23, the area of the part of the light source image 24 sticking out of (the area projected from) the effective region 23 becomes a minimum, and here the loss is about 9%. In the present embodiment, the difference of about 13% of the loss of FIG. 6B relative to the loss of FIG. 6A is an illumination efficiency improvement effect.

In FIG. 6C, when the aspect ratio difference of the light source image 24 relative to the effective region 23 amounts to the amount represented by the following Expression (6) or (7) using Expression (1), in either case, the sticking-out area of the light source image 24 relative to the effective region 23 is about 13%.

$$(\alpha X/2)/(\beta Y) \times (y/x) = 0.83 \quad (6)$$

$$(\alpha X/2)/(\beta Y) \times (y/x) = 1.20 \quad (7)$$

Thus, the difference of about 9% of the loss of FIG. 6C relative to the loss of FIG. 6A is an illumination efficiency improvement effect in these cases.

When the light source 18 having a rectangular light emitting surface of the same aspect ratio is applied to the effective region 23 having an aspect ratio of 2:3, the illumination efficiency is improved by about 13%. On the other hand, when the light source 18 having a light emitting surface having the aspect ratio difference represented by Expression (6) or (7) is applied to it, the illumination efficiency is improved by about 9%. Hence, an effect of about 70% of the greatest illumination efficiency improvement rate (about 13%) is obtained even where there is an aspect ratio difference between the effective region 23 and the light source 18.

When the aspect ratio difference between the effective region 23 and the light source 18 is within the range given by Expression (5), the illumination efficiency is reduced to about 50%. Thus, it is more preferred that for the rectangular effective region 23 having an aspect ratio of 2:3, the aspect ratio difference is within the range satisfying the requirement of the following Expression (8).

$$0.83 < (\alpha X/2)/(\beta Y) \times (y/x) < 1.20 \quad (8)$$

Embodiment 3

Next, referring to FIGS. 7A and 7B, a configuration of an illumination optical system in Embodiment 3 of the present invention will be described. FIGS. 7A and 7B are configuration diagrams of the illumination optical system in the present embodiment, and FIG. 7A illustrates a cross-sectional view when viewed in the Y direction and FIG. 7B illustrates a cross-sectional view when viewed in the X direction. The illumination optical system of the present embodiment is configured such that the light beam diameter in a first cross section (an XZ plane) or a second cross section (a YZ plane) can be changed, the cross sections being orthogonal to each other and including an optical axis OA.

In FIGS. 7A and 7B, reference numeral 25 denotes a light source (a light emitting diode). The light source 25 has a rectangular light emitting surface having an aspect ratio of about 2:3. The aspect ratio is a ratio of the width (the length) in the first cross section (the X direction) to the width (the length) in the second cross section (the Y direction). Reference numeral 10 denotes a condenser lens that concentrates light from the light source 25. Reference numeral 19 denotes an image display element (a liquid crystal image display element) having an aspect ratio of 4:3. The image display element 19 (a light modulation element) displays an image based on light (modulating the light) from a polarization conversion element 28 (a condenser lens 15) described below. Reference numeral 26 denotes a first fly-eye lens configured to have a plurality of lens cells 26a (a first lens cell) arranged in a matrix, on which light concentrated by the condenser lens 10 is incident. In the present embodiment, each lens cell 26a is rectangular and substantially similar in shape to the image display element 19.

Reference numeral 27 denotes a second fly-eye lens. The second fly-eye lens 27 has a plurality of lens cells 27a (a second lens cell) corresponding respectively to the plurality of lens cells 26a of the first fly-eye lens 26. Reference numeral 28 denotes a polarization conversion element. The polarization conversion element 28 performs polarization conversion on light from the second fly-eye lens 27 (putting the light into a predetermined polarization state). Reference numeral 15 denotes a condenser lens. In FIGS. 7A and 7B, the optical axis OA is parallel to the Z axis (the Z direction). The two cross sections including the optical axis OA and orthogonal to each other (the cross section illustrated in FIG. 7A and the cross section illustrated in FIG. 7B) are referred to as a first cross section (a cross section orthogonal to the Y axis) and a second cross section (a cross section orthogonal to the X axis), respectively.

The outline of the second fly-eye lens 27 is enlarged by about 13% relative to that of the first fly-eye lens 26 along the first cross section direction (the X direction) in FIG. 7A, and thus the illumination efficiency is improved without greatly enlarging the illumination optical system. Here, the aspect ratio of the lens cell 27a of the second fly-eye lens 27 is about 6:4.

Figure 8A:
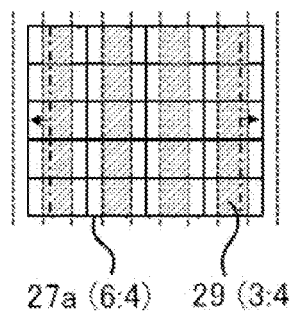
FIGS. 8A-8C are diagrams illustrating a relation between an effective region and a light source image of the illumination optical system in Embodiment 3.
Figure 8B:
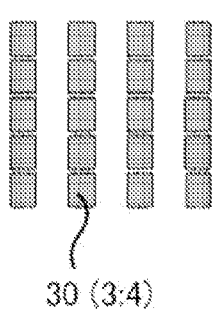
Figure 8C:
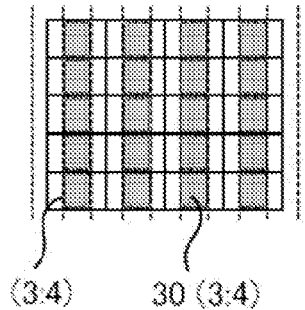

Subsequently, referring to FIGS. 8A to 8C, the shapes of the effective region 29 formed by the second fly-eye lens 27 and the polarization conversion element 28 and of the light source images 30 will be described. FIGS. 8A to 8C are diagrams illustrating a relation between the effective region and the light source image of the illumination optical system in the present embodiment.

FIG. 8A illustrates the shape of the effective region 29 formed by the second fly-eye lens 27 and the polarization conversion element 28. The aspect ratio of the lens cell 27a of the second fly-eye lens 27 is about 6:4. Hence, the effective region 29 is in a rectangular shape having an aspect ratio of about 3:4 due to the polarization conversion element 28. Thus, the effective region 29 has a shape of reducing the illumination efficiency for a radial light source image distribution created by, e.g., the discharge arc of a lamp and a reflector, although intended to improve the illumination efficiency at the cost of being enlarged.

FIG. 8B illustrates the shape of the light source image 30 formed by the illumination optical system in the present embodiment. In the present embodiment, the light source 25 having a light emitting surface of the same aspect ratio as that of the effective region 29 is used, and the light beam from the light source 25 is concentrated by the condenser lens 10. Hence, the light source images 30 are formed with holding the aspect ratio of 3:4 and the arrangement that are the same as those of the light emitting surface of the light source 25. Hence, as illustrated in FIG. 8C, the aspect ratios of the effective region 29 and the light source image 30 are substantially similar, and a reduction in the illumination efficiency can be prevented (or lessened) although the effective region 29 is rectangular.

According to the illumination optical system of the present embodiment, the outline of the second fly-eye lens 27 is enlarged with suppressing the enlargement of the optical system (the illumination optical system), and at the same time even when the effective regions 29 formed by the second fly-eye lens 27 and the polarization conversion element 28 are rectangular, high illumination efficiency can be maintained.

For example, in the present embodiment, the aspect ratio of the image display element 19 satisfies X:Y=4:3, and the aspect ratio of the light emitting surface of the light source 25 satisfies x:y=3:4. Because the enlargement ratio of the light beam diameter in the first cross section is about 13%, $\alpha$=1.13 is satisfied, and because the light beam diameter in the second cross section is not enlarged, $\beta$=1 is satisfied. Thus, a value of Expression (1), i.e. a value of the left side of Expression (2), representing the aspect ratio difference is 1, similarly to each of Embodiments 1 and 2.

Subsequently, referring to FIGS. 9A to 9C, a loss when a difference occurs in aspect ratio between the effective region 29 of the illumination optical system and the light emitting surface of the light source 25 will be described. FIGS. 9A to 9C are diagrams illustrating a loss when a difference occurs in aspect ratio between the effective region 29 and the light emitting surface of the light source 25. FIG. 9A illustrates the case where the light source 25 having a square light emitting surface of 1:1 in aspect ratio is applied to the rectangular effective region 29 having an aspect ratio of 3:4. FIG. 9B illustrates the case where the light source 25 having a rectangular light emitting surface, whose area is the same as that of the square, of the same aspect ratio (3:4) as that of the effective region 29 is applied to the effective region 29. FIG. 9C illustrates the case where there is some difference between the aspect ratio of the effective region 29 and the aspect ratio of the light emitting surface of the light source 25. Those drawings illustrate the way that a loss occurs for the respective cases.

In FIG. 9A, the loss of the illumination optical system can be generally represented by the area of the part sticking out of (a projection portion from) the effective region 29 relative to the total area of the light source image 30, and here the loss is about 17.5%.

On the other hand, in FIG. 9B, because a rectangular light source image 30 having the same aspect ratio as that of the effective region 29 is applied to the effective region 29, the area of the part of the light source image 30 sticking out of (projected from) the effective region 29 becomes a minimum, and here the loss is about 9%. In the present embodiment, the difference of about 8.5% of the loss of FIG. 9B relative to the loss of FIG. 9A is an illumination efficiency improvement effect.

In FIG. 9C, when the aspect ratio difference of the light source image 30 relative to the effective region 29 amounts to the amount represented by the following Expression (9) or (10) using Expression (1), in either case, the sticking-out area of the light source image 30 relative to the effective region 29 is about 11.5%.

$$(\alpha X/2)/(\beta Y) \times (y/x) = 0.86 \qquad (9)$$

$$(\alpha X/2)/(\beta Y) \times (y/x) = 1.16 \qquad (10)$$

Thus, the difference of about 6% of the loss of FIG. 9C relative to the loss of FIG. 9A is an illumination efficiency improvement effect in these cases.

When the light source 25 having a rectangular light emitting surface of the same aspect ratio is applied to the effective region 29 having an aspect ratio of 3:4, the illumination efficiency is improved by about 8.5%. On the other hand, when the light source 25 having a light emitting surface having the aspect ratio difference represented by Expression (9) or (10) is applied to it, the illumination efficiency is improved by about 6%. In this case, an effect of about 70% of the greatest illumination efficiency improvement rate (about 8.5%) is obtained.

If the aspect ratio difference between the effective region 29 and the light source 25 is within the range given by Expression (5), the illumination efficiency is reduced to about 20%. If the aspect ratio difference between the effective region 29 and the light source 25 is within the range given by Expression (8), the illumination efficiency is reduced to about 50%. Thus, it is more preferred that for the rectangular effective region 29 having an aspect ratio of 3:4, the aspect ratio difference is within the range satisfying the requirement of the following Expression (11).

$$0.86 < (\alpha X/2)/(\beta Y) \times (y/x) < 1.16 \qquad (11)$$

In each of Embodiments 1 to 3, as the aspect ratio of the effective region becomes closer to that of a square, the illumination efficiency improvement effect when the aspect ratios of the effective region and of the light emitting surface of the light source is made to coincide, becomes smaller. Subsequently, referring to FIG. 10, the illumination efficiency improvement effect will be described. FIG. 10 is a graph illustrating a change in the effect in accordance with the aspect ratio of the effective region, and in the graph the greatest illumination efficiency improvement effect is plotted in accordance with the aspect ratio of the effective region. In FIG. 10, a vertical axis represents the illumination efficiency improvement, and a horizontal axis represents the aspect ratio of the effective region. Dotted lines in FIG. 10 indicate aspect ratios of the effective region of 9:10 (0.9) and 11:10 (1.1), respectively.

As illustrated in FIG. 10, when the aspect ratio of the effective region is greater than or equal to 9:10 (0.9) and smaller than or equal to 11:10 (1.1), that is, the effective region is close to square, there is almost no illumination efficiency improvement effect. On the other hand, as the aspect ratio of the effective region becomes farther from 1, the illumination efficiency improvement effect improves. Thus, in order to obtain a sufficient effect of illumination efficiency improvement in each embodiment, it is preferred that the aspect ratio X:Y of the image display element and change rates $\alpha$ and $\beta$ (compression or enlargement rate) are set such that the aspect ratio of the effective region satisfies the range represented by the following Expression (12).

$$(\alpha X/2)/(\beta Y) < 0.9 \text{ or } 1.1 < (\alpha X/2)/(\beta Y) \qquad (12)$$

Embodiment 4

Figure 11A:
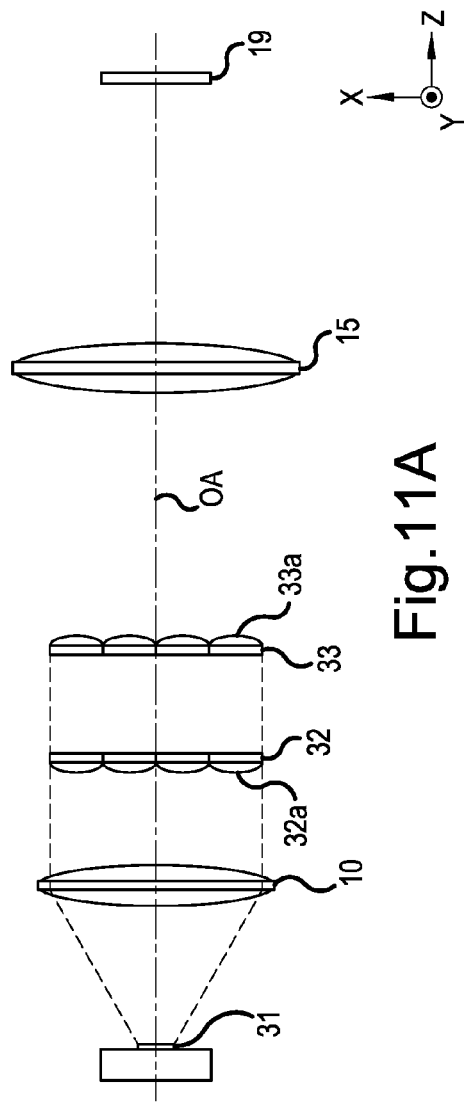
FIGS. 11A and 11B are configuration diagrams of an illumination optical system in Embodiment 4.
Figure 11B:
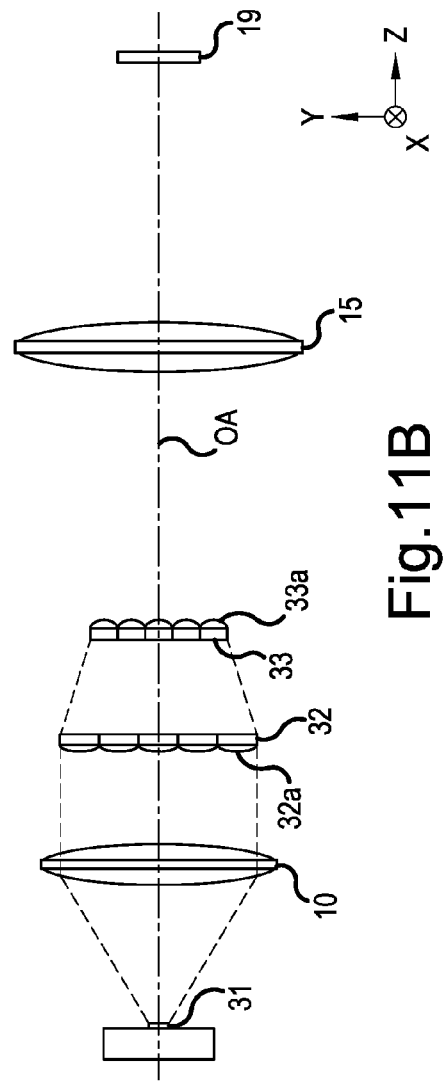

Next, referring to FIGS. 11A and 11B, a configuration of an illumination optical system in Embodiment 4 of the present invention will be described. FIGS. 11A and 11B are configuration diagrams of the illumination optical system in the present embodiment, and FIG. 11A illustrates a cross-sectional view when viewed in the Y direction and FIG. 11B illustrates a cross-sectional view when viewed in the X direction. The illumination optical system of the present embodiment is configured such that the light beam diameters in a first cross section (an XZ plane) and a second cross section (a YZ plane) can be changed, the cross sections being orthogonal to each other and including an optical axis OA.

In FIGS. 11A and 11B, reference numeral 31 denotes a light source (a light emitting diode). The light source 31 has a rectangular light emitting surface having an aspect ratio of about 2:1. The aspect ratio is a ratio of the width (the length) in the first cross section (the X direction) to the width (the length) in the second cross section (the Y direction). Reference numeral 10 denotes a condenser lens that concentrates light from the light source 31. Reference numeral 19 denotes an image display element (a liquid crystal image display element) having an aspect ratio of 4:3. The image display element 19 (a light modulation element) displays an image based on light (modulating the light) from a second fly-eye lens 33 (a condenser lens 15) described below. Reference numeral 32 denotes a first fly-eye lens configured to have a plurality of lens cells 32a (a first lens cell) arranged in a matrix, on which light concentrated by the condenser lens 10 is incident. In the present embodiment, each lens cell 32a is rectangular and substantially similar in shape to the image display element 19.

Reference numeral 33 denotes a second fly-eye lens having a plurality of lens cells 33a (a second lens cell) corresponding respectively to the plurality of lens cells 32a of the first fly-eye lens 32. Reference numeral 15 denotes a condenser lens. In FIGS. 11A and 11B, the optical axis OA is parallel to the Z axis (the Z direction). The two cross sections including the optical axis OA and orthogonal to each other (the cross section illustrated in FIG. 11A and the cross section illustrated in FIG. 11B) are referred to as a first cross section (a cross section orthogonal to the Y axis) and a second cross section (a cross section orthogonal to the X axis), respectively.

The outline of the second fly-eye lens 33 is compressed in size to about 75% of that of the first fly-eye lens 32 along the second cross section direction (the Y direction) in FIG. 11A, and thus the illumination optical system is made smaller. Here, the aspect ratio of the lens cell 33a of the second fly-eye lens 33 is about 2:1.

Figure 12A:
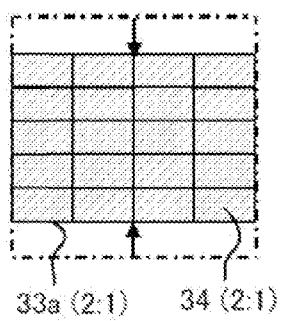
FIGS. 12A-12C are diagrams illustrating a relation between an effective region and a light source image of the illumination optical system in Embodiment 4.
Figure 12B:
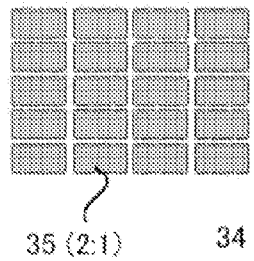
Figure 12C:
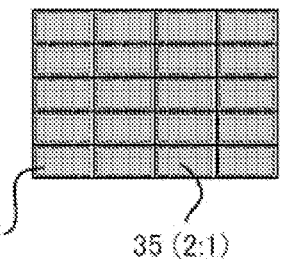

Subsequently, referring to FIGS. 12A to 12C, the shapes of the effective region 34 formed by the second fly-eye lens 33 and of the light source images 35 will be described. FIGS. 12A to 12C are diagrams illustrating a relation between the effective region and light source image of the illumination optical system in the present embodiment. The illumination optical system of the present embodiment differs from the illumination optical system of each of Embodiments 1 to 3 in that it does not include a polarization conversion element. Hence, as illustrated in FIG. 12A, the shape of the effective region 34 is the same as that of the lens cell 33a of the second fly-eye lens 33, and the effective region 34 is in a rectangular shape having an aspect ratio of 2:1. Thus, the effective region 34 has a shape of reducing the illumination efficiency for a radial light source image distribution created by, e.g., the discharge arc of a lamp and a reflector.

FIG. 12B illustrates the shape of light source images 35 formed by the illumination optical system in the present embodiment. In the present embodiment, the light source 31 having a light emitting surface of the same aspect ratio as that of the effective region 34 is used, and the light beam from the light source 31 is concentrated by the condenser lens 10. Hence, the light source images 35 are formed with holding the aspect ratio of 2:1 and the arrangement that are the same as those of the light emitting surface of the light source 31. Hence, as illustrated in FIG. 12C, the aspect ratios of the effective region 34 and the light source image 35 are substantially similar, and a reduction in the illumination efficiency can be prevented (or lessened) although the effective region 34 is rectangular.

According to the illumination optical system of the present embodiment, the outline of the second fly-eye lens 33 is compressed, thus succeeding in making the optical system (the illumination optical system) smaller, and at the same time even when the effective regions 34 formed by the lens cell 33a of the second fly-eye lens 33 are rectangular, high illumination efficiency can be maintained.

In the present embodiment, the aspect ratio of the effective region 34 and the aspect ratio of the light emitting surface of the light source 31 are made to coincide substantially, but even when there is some aspect ratio difference similarly to each of Embodiments 1 to 3, a sufficient effect can be obtained. The aspect ratio difference between the effective region and the light emitting surface is represented by the following Expression (13).

$$(\alpha X)/(\beta Y) \times (y/x) \quad (13)$$

Because the illumination optical system of the present embodiment is not provided with a polarization conversion element, the factor of ½ in Expression (1) representing the aspect ratio of the effective region is removed.

In the present embodiment, similarly to Embodiment 1, the effective region 34 is in a rectangular shape having an aspect ratio of 2:1. When the light source 31 having a rectangular light emitting surface of the same aspect ratio is applied to the rectangular effective region 34, the illumination efficiency improvement is about 23%. On the other hand, when a light source having a light emitting surface having the aspect ratio difference represented by Expression (14) or (15) is applied to it, the illumination efficiency improvement is about 16%, and an effect of about 70% of the greatest illumination efficiency improvement is obtained.

$$(\alpha X)/(\beta Y) \times (y/x) = 0.78 \quad (14)$$

$$(\alpha X)/(\beta Y) \times (y/x) = 1.28 \quad (15)$$

Thus, it is preferred that the light source 31 having a rectangular light emitting surface of the same aspect ratio is applied to the rectangular effective region 34, but as long as the requirement represented by the following Expression (16) is satisfied, a sufficient illumination efficiency improvement effect is obtained.

$$0.78 < (\alpha X)/(\beta Y) \times (y/x) < 1.28 \quad (16)$$

Embodiment 5

Next, referring to FIGS. 13A and 13B, a configuration of an illumination optical system in Embodiment 5 of the present invention will be described. FIGS. 13A and 13B are configuration diagrams of the illumination optical system in the present embodiment, and FIG. 13A illustrates a cross-sectional view when viewed in the Y direction and FIG. 13B illustrates a cross-sectional view when viewed in the X direction. The illumination optical system of the present embodiment is configured such that the light beam diameters in a first cross section (an XZ plane) and a second cross section (a YZ plane) can be changed, the cross sections being orthogonal to each other and including an optical axis OA.

In FIGS. 13A and 13B, reference numeral 9 denotes a light source (a light emitting diode). The light source 9 has a rectangular light emitting surface having an aspect ratio of about 1:2. The aspect ratio is a ratio of the width (the length) in the first cross section (the X direction) to the width (the length) in the second cross section (the Y direction). Reference numeral 36 denotes a condenser lens that concentrates light from the light source 9. Reference numeral 37 denotes a rod integrator. Light concentrated by the condenser lens 36 is incident on the rod integrator 37. Reference numeral 38 denotes a DMD (a digital micro-mirror device) having an aspect ratio of 4:3 and constitutes an image display element. The DMD 38 (a light modulation element) displays an image based on light (modulating the light) from the rod integrator 37 (a condenser lens 39 and a total reflection prism 40). Reference numeral 39 denotes an imaging lens, and reference numeral 40 denotes a total reflection prism. In FIGS. 13A and 13B, the optical axis OA is parallel to the Z axis (the Z direction). The two cross sections including the optical axis OA and orthogonal to each other (the cross section illustrated in FIG. 13A and the cross section illustrated in FIG. 13B) are referred to as a first cross section (a cross section orthogonal to the Y axis) and a second cross section (a cross section orthogonal to the X axis), respectively.

Light emitted from the light source 9 is concentrated by the condenser lens 36 and forms a light source image 42 at (or near) the entrance surface 41 of the rod integrator 37. The rod integrator 37 is an element to uniformize (homogenize) the illumination distribution with which the image display element is illuminated, similarly to the fly-eye lens. The light beam having been incident on the rod integrator 37 is totally reflected repeatedly therein, and a uniform illumination distribution is obtained from the exit surface 43. The exit surface 43, similar in shape to the DMD 38, has an aspect ratio of 4:3, and the light beam emitted from the exit surface 43 passes through the imaging lens 39 and is totally reflected by the boundary surface of the total reflection prism 40 to perform critical illumination on the DMD 38 uniformly with a rectangular area of light. For the light beam having been incident on the DMD 38, the optical path is switched by a movable micro-mirror which constitutes the DMD 38. The light beam whose optical path has been switched is projected onto a screen (a projection surface) via a projection optical system.

The total reflection prism 40 switches incidence and reflection optical paths to the DMD 38 with use of total reflection at the boundary surface. Hence, when the angle spread of the light beam incident on the DMD 38 becomes so large as to be at the critical angle (or at close to it), crosstalk occurs between the reflection optical path on the entrance side and the transmission optical path on the exit side. This causes a reduction in contrast of an image (video).

In the present embodiment, a size of the entrance surface 41 of the rod integrator 37 is compressed by about 63% relative to that of the exit surface 43 along the first cross section direction (the X direction), so that the rod integrator 37 is in a so-called tapered rod shape. Because the width (the length along the X direction) of the entrance surface 41 is smaller than the width (the length along the X direction) of the exit surface 43, the angle of the light beam emitted from the exit surface 43 is smaller. Thus, the angle spread of the light beam illuminating the DMD 38 becomes smaller, and thus a reduction in contrast can be prevented (or lessened).

However, the size of the entrance surface 41 of the rod integrator 37 is compressed by about 63% relative to that of the exit surface 43 having an aspect ratio of 4:3 in the first cross section, so that the entrance surface 41 is in a rectangular shape having an aspect ratio of 1:2. Thus, the entrance surface 41 has a shape of reducing the illumination efficiency for a radial light source image distribution created by, e.g., the discharge arc of a lamp and a reflector. In other words, the exit surface 43 of the rod integrator 37 corresponds in shape to the lens cell of the first fly-eye lens in each of Embodiments 1 to 4, and the entrance surface 41 corresponds in shape to the lens cell of the second fly-eye lens. Further, the entrance surface 41 of the rod integrator 37 corresponds to the effective region in each of Embodiments 1 to 4.

Figure 14A:
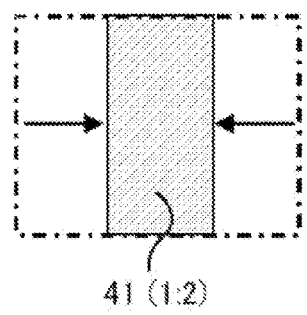
FIGS. 14A-14C are diagrams illustrating a relation between an effective region and a light source image of the illumination optical system in Embodiment 5.
Figure 14B:
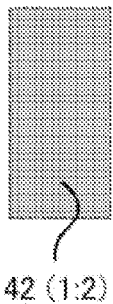
Figure 14C:
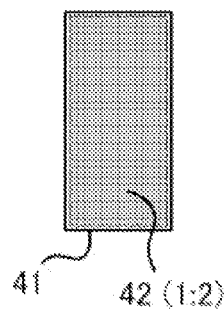

Subsequently, referring to FIGS. 14A to 14C, the shapes of the entrance surface 41 (the effective region) of the rod integrator 37 and of the light source image 42 will be described. FIGS. 14A and 14C are diagrams illustrating a relation between the effective region (the entrance surface 41 of the rod integrator 37) and the light source image 42 of the illumination optical system in the present embodiment.

In the present embodiment, as illustrated in FIG. 14A, the light source 9 having a light emitting surface of an aspect ratio of 1:2 that is the same as that of the effective region (the entrance surface 41 of the rod integrator) is used, and the light beam from the light source 9 is concentrated by the condenser lens 36. Hence, as illustrated in FIG. 14B, the light source image 42 is formed on the entrance surface 41 of the rod integrator 37 with holding the aspect ratio of 1:2 and the arrangement that are the same as those of the light emitting surface of the light source 9. Accordingly, as illustrated in FIG. 14C, the aspect ratios of the effective region (the entrance surface 41 of the rod integrator 37) and the light source image 42 are substantially similar, and a reduction in the illumination efficiency can be prevented (or lessened) although the effective region is rectangular.

As described above, in the illumination optical system using the rod integrator of the present embodiment, even when the effective region formed by the entrance surface of the rod integrator is rectangular, high illumination efficiency can be maintained.

According to the configuration of the present embodiment, because the aspect ratio of the effective region (the entrance surface 41) and the aspect ratio of the light emitting surface of the light source 9 are made to coincide substantially, the greatest illumination efficiency improvement effect is obtained. However, even when there is some aspect ratio difference between the effective region (the entrance surface 41) and the light emitting surface of the light source 9 similarly to each of Embodiments 1 and 4, as long as the requirement represented by the following Expression (17) is satisfied, a sufficient illumination efficiency improvement effect is obtained.

$$0.78 < (\alpha X)/(\beta Y) \times (y/x) < 1.28 \tag{17}$$

In the present embodiment, widths of the exit surface 43 of the rod integrator 37 are denoted by D3x and D3y, and widths of the entrance surface 41 of the rod integrator 37 are denoted by D4x and D4y. The change rates α and β (compression or enlargement rate) of the light beam diameters are defined as α=D4x/D3x and β=D4y/D3y.

According to each of the embodiments, an illumination optical system having high illumination efficiency and an image projection apparatus having the illumination optical system can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Although in each of the embodiments the shape of the light emitting surface of the light source is a rectangle, the present invention is not limited to this. For example, the shape of the light emitting surface may be an ellipse. In this case, the length of the major axis (longer diameter) and the length of the minor axis (shorter diameter) of the ellipse correspond to the widths x and y, respectively, of the rectangle of the light emitting surface in each of the embodiments.

Although in each of the embodiments a light emitting diode is used as the light source, the present invention is not limited to this. A surface-emitting light source is suitably used as the light source, and other light sources such as a laser light source or an organic electro-luminescence device can also be used as long as a shape of the light emitting surface can be arbitrarily determined. The light source may also be designed to be arrayed, i.e. a unit light emitting surface is arrayed, such that the outline of the light source array is in a shape that satisfies each requirement in each embodiment.

This application claims the benefit of Japanese Patent Application No. 2013-025152, filed on Feb. 13, 2013, which is hereby incorporated by reference herein in its entirety.

What is claimed is:

1. An illumination optical system capable of changing a light beam diameter in at least one of a first cross section and a second cross section orthogonal to each other, the first and second cross sections including an optical axis, the illumination optical system comprising:
   a light source;
   a condenser lens configured to concentrate light from the light source;
   a first fly-eye lens including a first lens cell on which light concentrated by the condenser lens is incident;
   a second fly-eye lens including a second lens cell corresponding to the first lens cell;
   a polarization conversion element configured to perform polarization conversion on light from the second fly-eye lens; and
   an image display element configured to display an image based on light from the polarization conversion element,
   wherein the following relations are satisfied:

$(\alpha X/2)/(\beta Y) < 0.9$ or $1.1 < (\alpha X/2)/(\beta Y)$, and $0.78 < (\alpha X/2)/(\beta Y) \times (y/x) < 1.28$, where X and Y are widths of the image display element in the first and second cross sections respectively, x and y are widths of a light emitting surface of the light source in the first and second cross sections respectively, D1x and D1y are widths of the first fly-eye lens in the first and second cross sections respectively, D2x and D2y are widths of the second fly-eye lens in the first and second cross sections respectively, and change rates $\alpha$ and $\beta$ of the light beam diameters in the first and second cross sections respectively are defined as $\alpha = D2x/D1x$ and $\beta = D2y/D1y$.

2. The illumination optical system according to claim 1, wherein the following relation is satisfied:

$(\alpha X/2)/(\beta Y) \times (y/x) = 1$.

3. The illumination optical system according to claim 1, wherein a shape of the light emitting surface of the light source is a rectangle.

4. The illumination optical system according to claim 1, wherein a shape of the light emitting surface of the light source is an ellipse.

5. The illumination optical system according to claim 1, wherein the light emitting surface of the light source is formed by arraying unit light emitting surfaces.

6. The illumination optical system according to claim 1, wherein the light source is a surface-emitting light source.

7. The illumination optical system according to claim 1, wherein the light source is a light emitting diode.

8. The illumination optical system according to claim 1, wherein the light source is a laser light source.

9. The illumination optical system according to claim 1, wherein the light source is an organic electro-luminescence device.

10. An illumination optical system capable of changing a light beam diameter in at least one of a first cross section and a second cross section orthogonal to each other, the first and second cross sections including an optical axis, the illumination optical system comprising:
    a light source;
    a condenser lens configured to concentrate light from the light source;
    a first fly-eye lens including a first lens cell on which light concentrated by the condenser lens is incident;
    a second fly-eye lens including a second lens cell corresponding to the first lens cell; and
    an image display element configured to display an image based on light from the second fly-eye lens,
    wherein the following relations are satisfied:

$(\alpha X)/(\beta Y) < 0.9$ or $1.1 < (\alpha X)/(\beta Y)$, and $0.78 < (\alpha X)/(\beta Y) \times (y/x) < 1.28$, where X and Y are widths of the image display element in the first and second cross sections respectively, x and y are widths of a light emitting surface of the light source in the first and second cross sections respectively, D1x and D1y are widths of the first fly-eye lens in the first and second cross sections respectively, D2x and D2y are widths of the second fly-eye lens in the first and second cross sections respectively, and change rates $\alpha$ and $\beta$ of the light beam diameters in the first and second cross sections respectively are defined as $\alpha = D2x/D1x$ and $\beta = D2y/D1y$.

11. The illumination optical system according to claim 10, wherein the following relation is satisfied:

$(\alpha X)/(\beta Y) \times (y/x) = 1$.

12. An illumination optical system capable of changing a light beam diameter in at least one of a first cross section and a second cross section orthogonal to each other, the first and second cross sections including an optical axis, the illumination optical system comprising:
    a light source;
    a condenser lens configured to concentrate light from the light source;

a rod integrator on which light concentrated by the condenser lens is incident; and an image display element configured to display an image based on light from the rod integrator, wherein the following relations are satisfied:

$$(\alpha X)/(\beta Y)<0.9 \text{ or } 1.1<(\alpha X)/(\beta Y), \text{ and}$$

$$0.78<(\alpha X)/(\beta Y)\times(y/x)<1.28,$$

where X and Y are widths of the image display element in the first and second cross sections respectively, x and y are widths of a light emitting surface of the light source in the first and second cross sections respectively, D3x and D3y are widths of an exit surface of the rod integrator in the first and second cross sections respectively, D4x and D4y are widths of an entrance surface of the rod integrator in the first and second cross sections respectively, and change rates $\alpha$ and $\beta$ of the light beam diameters in the first and second cross sections respectively are defined as $\alpha=D4x/D3x$ and $\beta=D4y/D3y$.

13. The illumination optical system according to claim 12, wherein the following relation is satisfied:

$$(\alpha X)/(\beta Y)\times(y/x)=1.$$

14. An image projection apparatus capable of changing a light beam diameter in at least one of a first cross section and a second cross section orthogonal to each other, the first and second cross sections including an optical axis, the image projection apparatus comprising:

a light source;

a condenser lens configured to concentrate light from the light source;

a first fly-eye lens including a first lens cell on which light concentrated by the condenser lens is incident;

a second fly-eye lens including a second lens cell corresponding to the first lens cell;

a polarization conversion element configured to perform polarization conversion on light from the second fly-eye lens; and an image display element configured to display an image based on light from the polarization conversion element, wherein the following relations are satisfied:

$$(\alpha X/2)/(\beta Y)<0.9 \text{ or } 1.1<(\alpha X/2)/(\beta Y), \text{ and}$$

$$0.78<(\alpha X/2)/(\beta Y)\times(y/x)<1.28,$$

where X and Y are widths of the image display element in the first and second cross sections respectively, x and y are widths of a light emitting surface of the light source in the first and second cross sections respectively, D1x and D1y are widths of the first fly-eye lens in the first and second cross sections respectively, D2x and D2y are widths of the second fly-eye lens in the first and second cross sections respectively, and change rates $\alpha$ and $\beta$ of the light beam diameters in the first and second cross sections respectively are defined as $\alpha=D2x/D1x$ and $\beta=D2y/D1y$.

15. An illumination optical system comprising:

a light emitting surface;

a condenser lens configured to concentrate light from the light emitting surface;

a first fly-eye lens including a first lens cell on which light concentrated by the condenser lens is incident;

a second fly-eye lens including a second lens cell corresponding to the first lens cell;

a polarization conversion element configured to perform polarization conversion on light from the second fly-eye lens; and an image display element configured to display an image based on light from the polarization conversion element, wherein the following relations are satisfied:

$$(\alpha X/2)/(\beta Y)<0.9 \text{ or } 1.1<(\alpha X/2)/(\beta Y), \text{ and}$$

$$0.78<(\alpha X/2)/(\beta Y)\times(y/x)<1.28,$$

where X and Y are widths of the image display element in a first cross section and a second cross section respectively, the first and second cross sections are orthogonal to each other and include an optical axis of the illumination system, x and y are widths of the light emitting surface in the first and second cross sections respectively, D1x and D1y are widths of the first fly-eye lens in the first and second cross sections respectively, D2x and D2y are widths of the second fly-eye lens in the first and second cross sections respectively, and change rates $\alpha$ and $\beta$ of a light beam diameters in the first and second cross sections respectively are defined as $\alpha=D2x/D1x$ and $\beta=D2y/D1y$.

16. An illumination optical system comprising:

a light emitting surface;

a condenser lens configured to concentrate light from the light emitting surface;

a first fly-eye lens including a first lens cell on which light concentrated by the condenser lens is incident;

a second fly-eye lens including a second lens cell corresponding to the first lens cell; and an image display element configured to display an image based on light from the second fly-eye lens, wherein the following relations are satisfied:

$$(\alpha X)/(\beta Y)<0.9 \text{ or } 1.1<(\alpha X)/(\beta Y), \text{ and}$$

$$0.78<(\alpha X)/(\beta Y)\times(y/x)<1.28,$$

where X and Y are widths of the image display element in a first cross section and a second cross section respectively, the first and second cross sections are orthogonal to each other and include an optical axis of the illumination system, x and y are widths of the light emitting surface in the first and second cross sections respectively, D1x and D1y are widths of the first fly-eye lens in the first and second cross sections respectively, D2x and D2y are widths of the second fly-eye lens in the first and second cross sections respectively, and change rates $\alpha$ and $\beta$ of a light beam diameters in the first and second cross sections respectively are defined as $\alpha=D2x/D1x$ and $\beta=D2y/D1y$.

17. An illumination optical system comprising:

a light emitting surface;

a condenser lens configured to concentrate light from the light emitting surface;

a rod integrator on which light concentrated by the condenser lens is incident; and an image display element configured to display an image based on light from the rod integrator, wherein the following relations are satisfied:

$$(\alpha X)/(\beta Y)<0.9 \text{ or } 1.1<(\alpha X)/(\beta Y), \text{ and}$$

$$0.78<(\alpha X)/(\beta Y)\times(y/x)<1.28,$$

where X and Y are widths of the image display element in a first cross section and a second cross section respectively, the first and second cross sections are orthogonal to each other and include an optical axis of the illumination system, x and y are widths of the light emitting surface in the first and second cross sections respectively, D3$x$ and D3$y$ are widths of an exit surface of the rod integrator in the first and second cross sections respectively, D4$x$ and D4$y$ are widths of an entrance surface of the rod integrator in the first and second cross sections respectively, and change rates $\alpha$ and $\beta$ of a light beam diameters in the first and second cross sections respectively are defined as $\alpha$=D4$x$/D3$x$ and $\beta$=D4$y$/D3$y$.

18. An image projection apparatus comprising:
a light emitting surface;
a condenser lens configured to concentrate light from the light emitting surface;
a first fly-eye lens including a first lens cell on which light concentrated by the condenser lens is incident;
a second fly-eye lens including a second lens cell corresponding to the first lens cell;
a polarization conversion element configured to perform polarization conversion on light from the second fly-eye lens; and
an image display element configured to display an image based on light from the polarization conversion element,
wherein the following relations are satisfied:

$(\alpha X/2)/(\beta Y) < 0.9$ or $1.1 < (\alpha X/2)/(\beta Y)$, and $0.78 < (\alpha X/2)/(\beta Y) \times (y/x) < 1.28$, where X and Y are widths of the image display element in a first cross section and a second cross section respectively, the first and second cross sections are orthogonal to each other and include an optical axis of the illumination system, x and y are widths of the light emitting surface in the first and second cross sections respectively, D1$x$ and D1$y$ are widths of the first fly-eye lens in the first and second cross sections respectively, D2$x$ and D2$y$ are widths of the second fly-eye lens in the first and second cross sections respectively, and change rates $\alpha$ and $\beta$ of a light beam diameters in the first and second cross sections respectively are defined as $\alpha$=D2$x$/D1$x$ and $\beta$=D2$y$/D1$y$.

\* \* \* \* \*